May 8, 1923.

H. J. KOCH

WIREBOUND BOX MACHINE

Filed Nov. 11, 1918

Inventor:
Henry J. Koch
By Emery, Booth, Janney & Varney
Atty's.

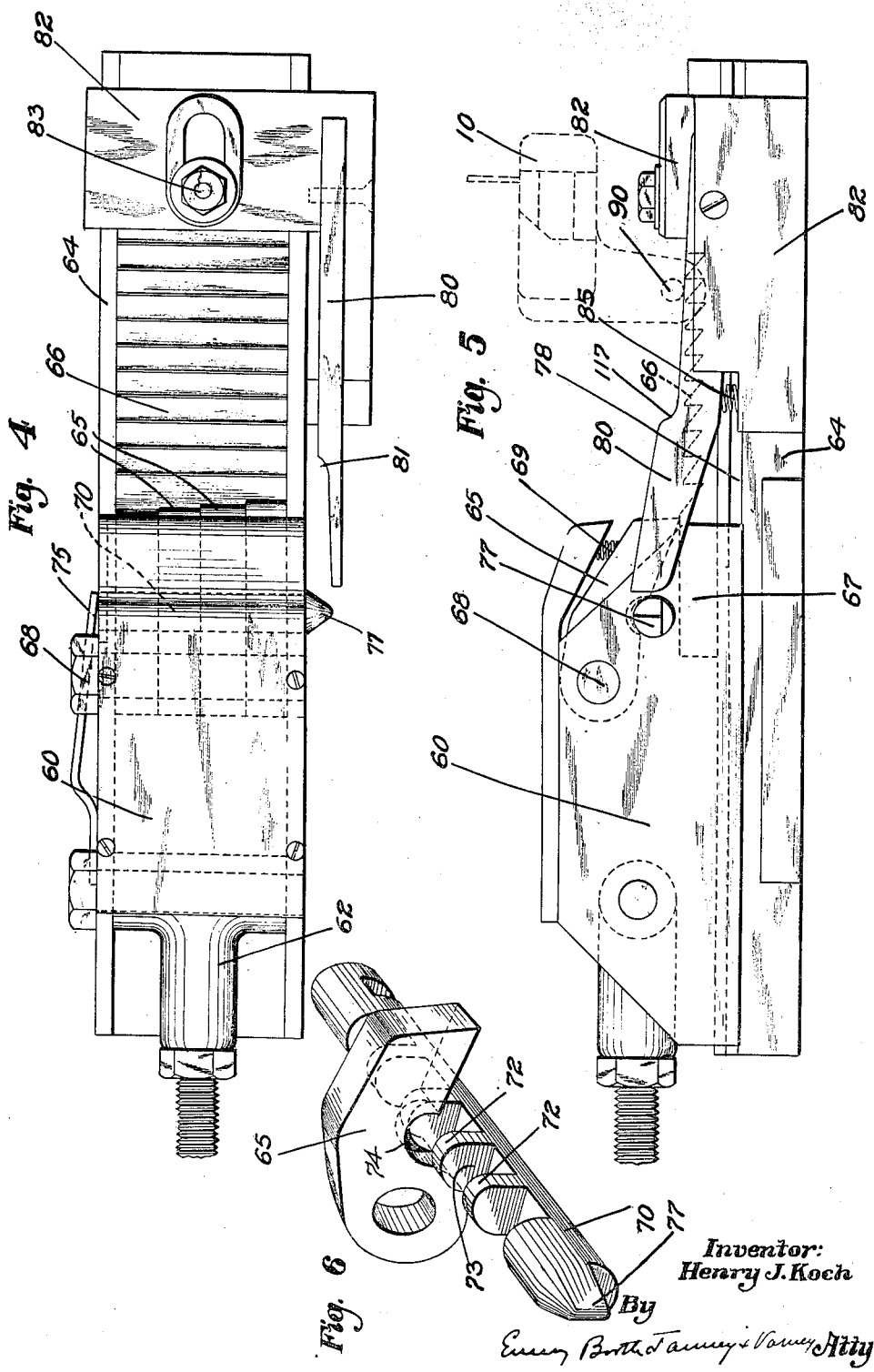

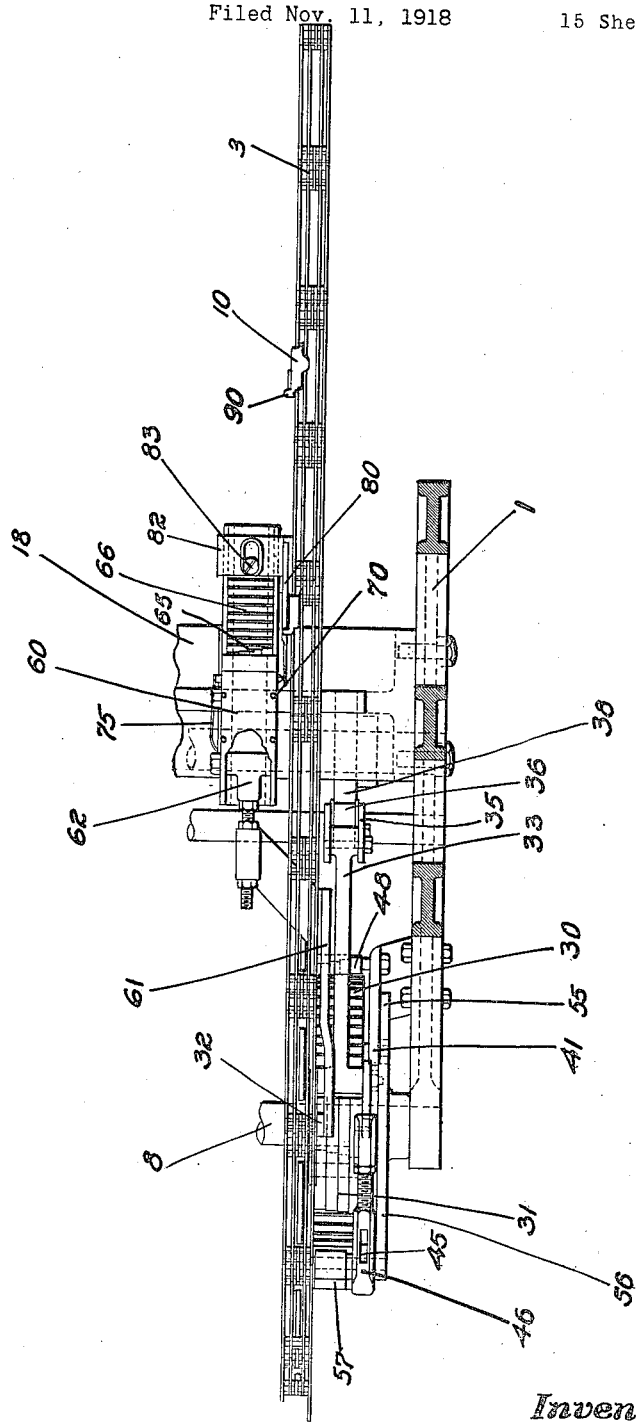

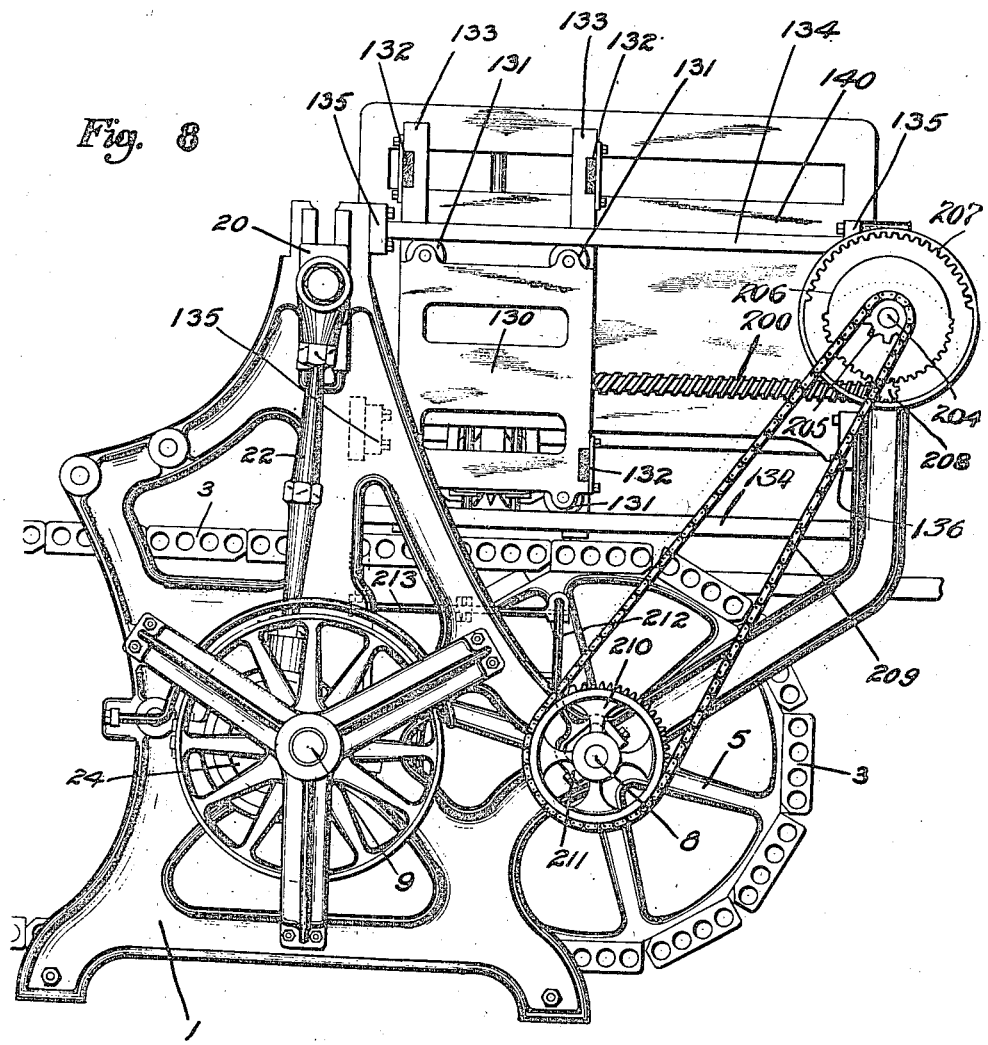

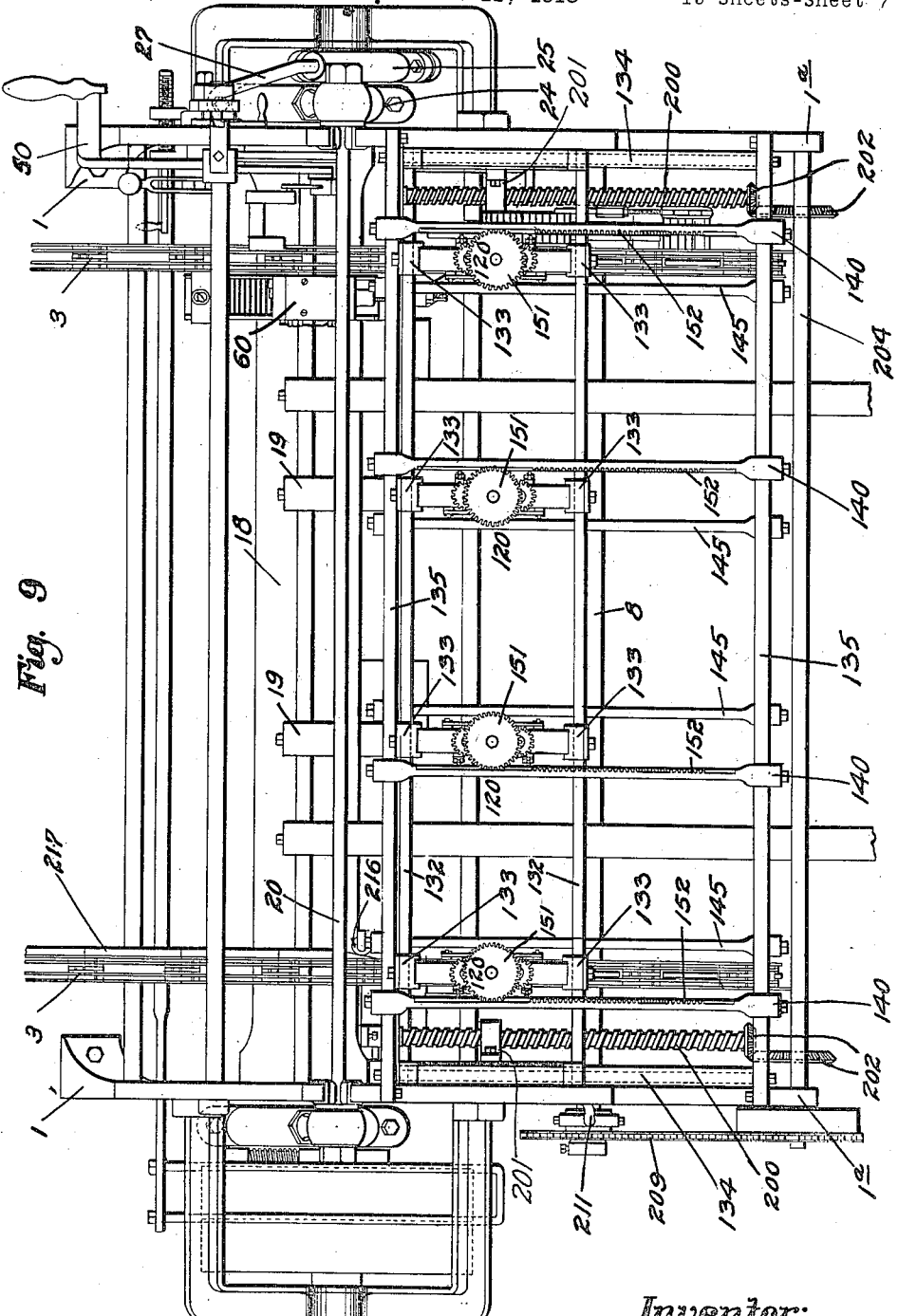

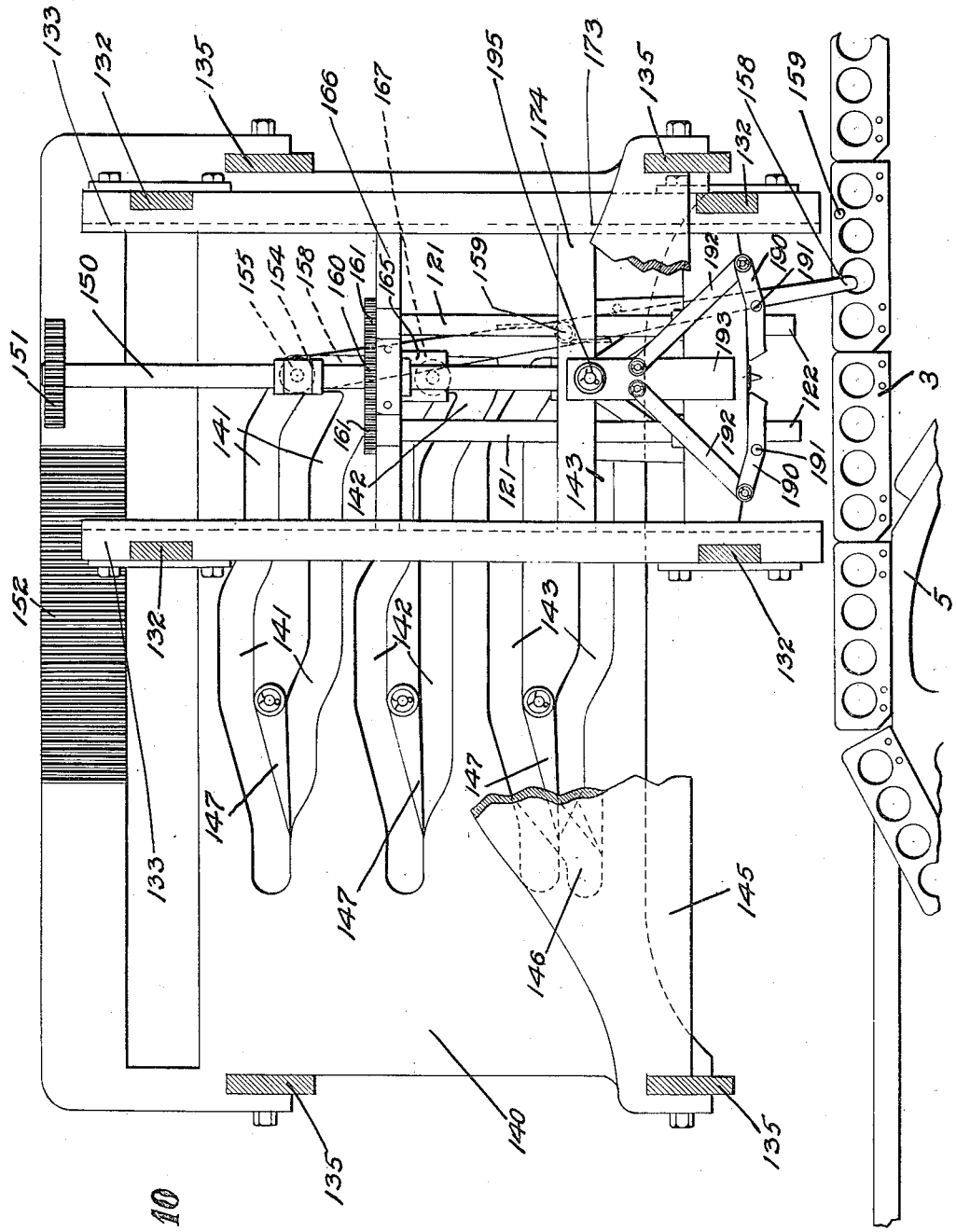

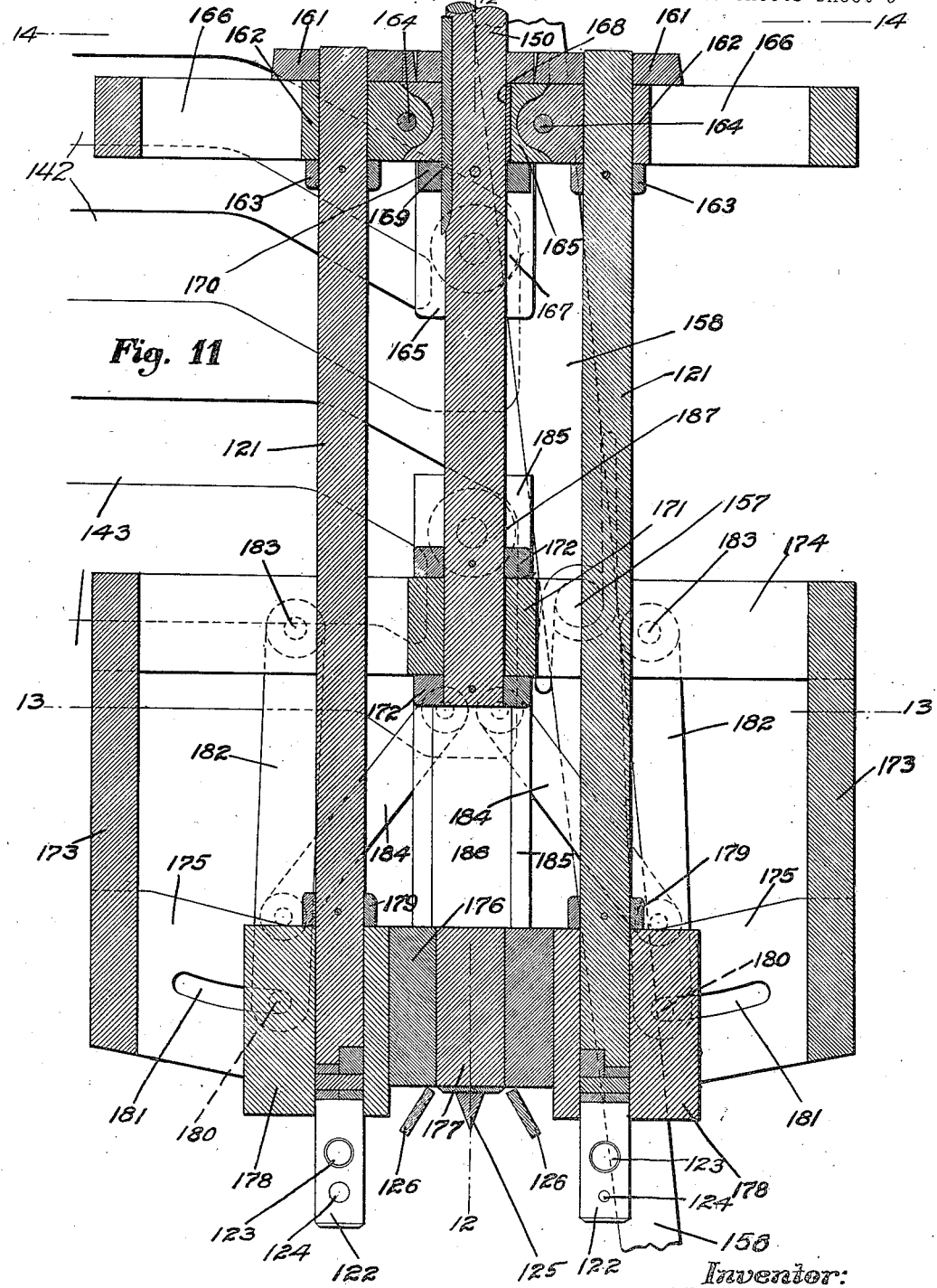

May 8, 1923.

H. J. KOCH

WIREBOUND BOX MACHINE

Filed Nov. 11, 1918

Inventor:
Henry J. Koch
By Emery Booth Janney Varney
Atty's.

May 8, 1923.

H. J. KOCH

WIREBOUND BOX MACHINE

Filed Nov. 11, 1918

Inventor:
Henry J. Koch
By Emery Booth Janney & Varney
Atty's.

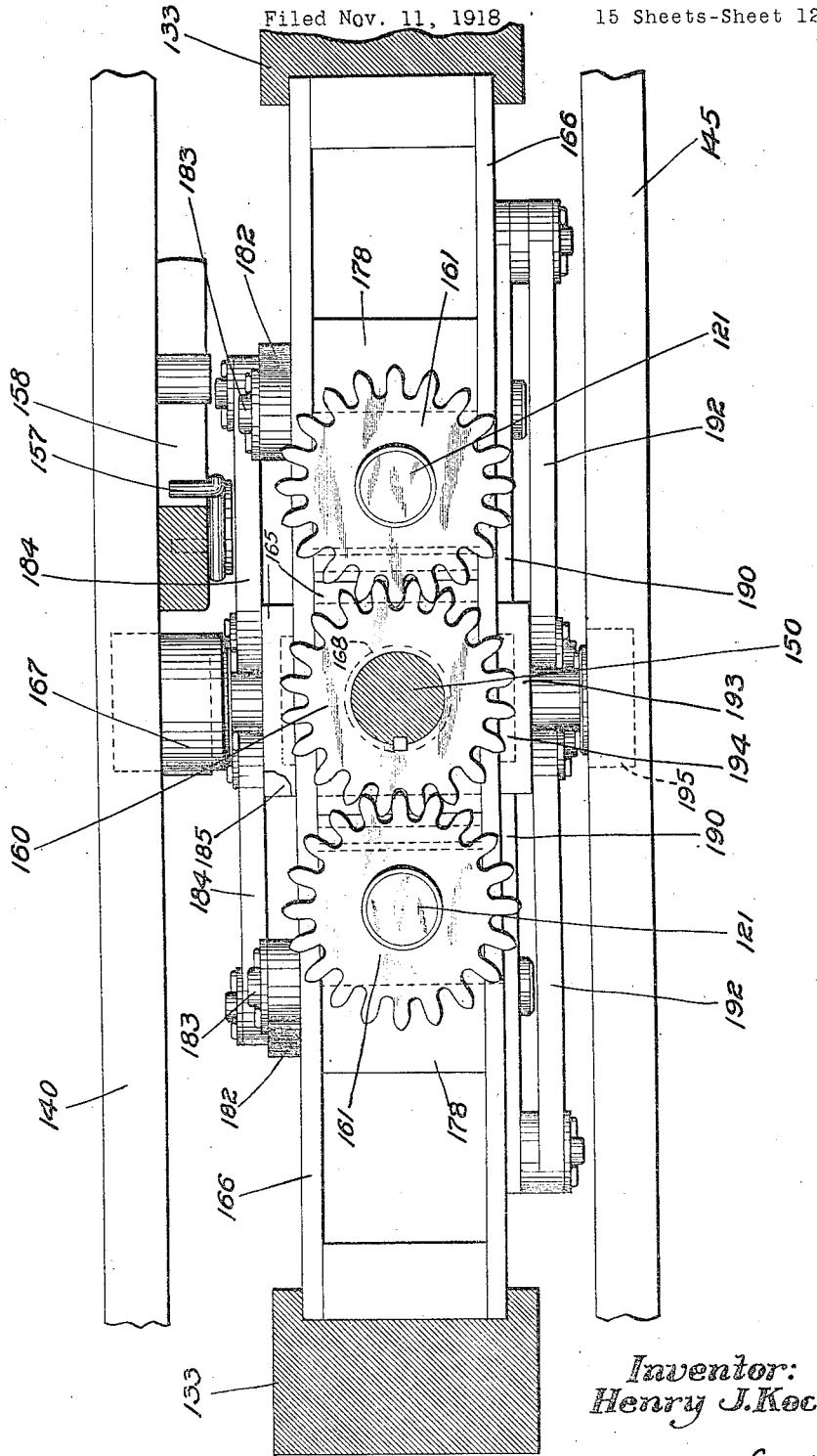

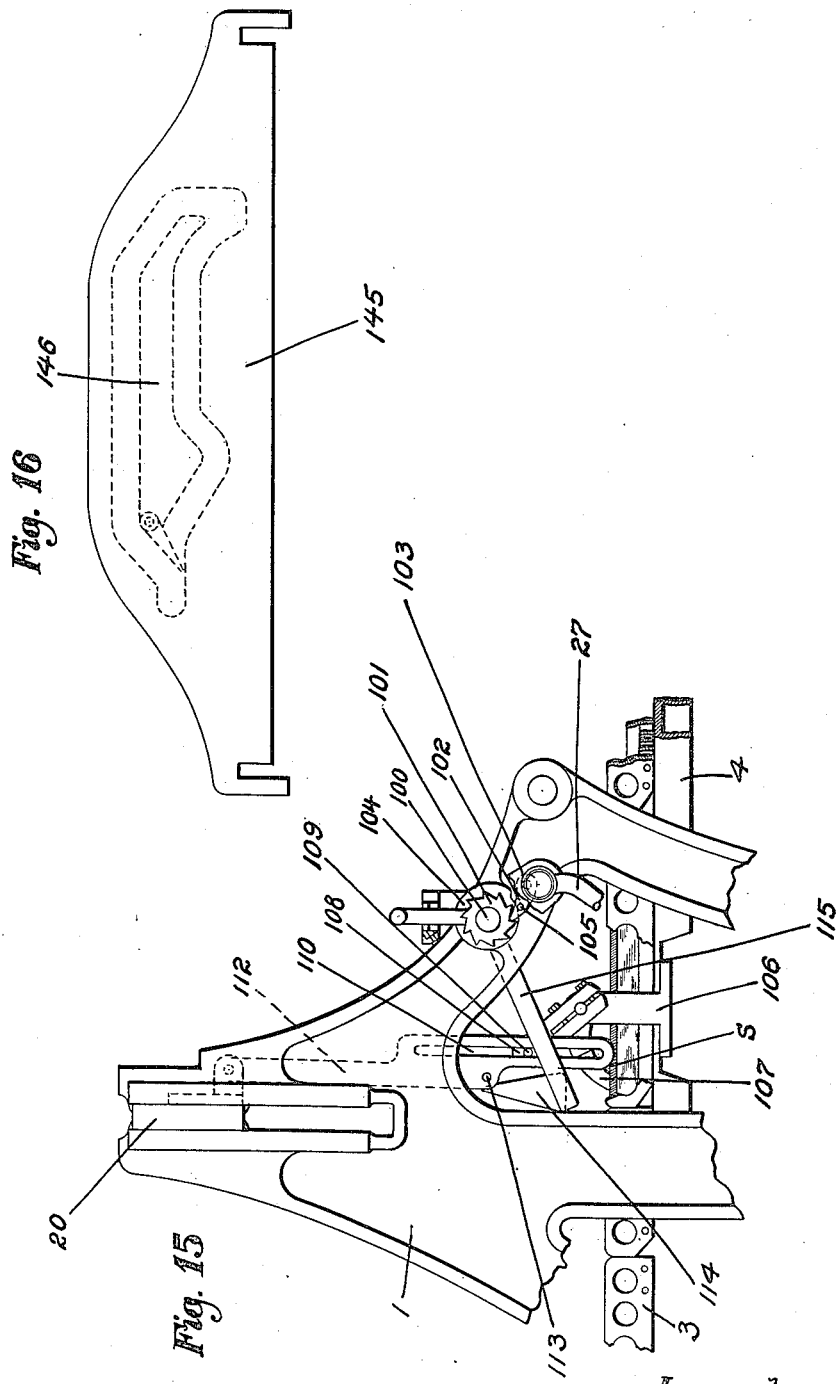

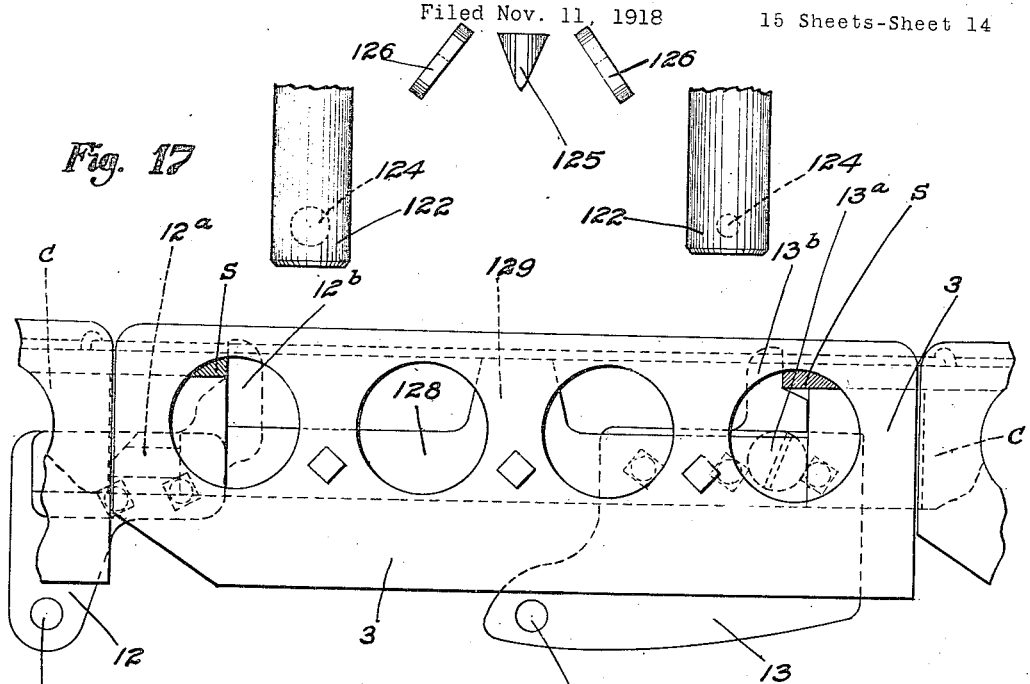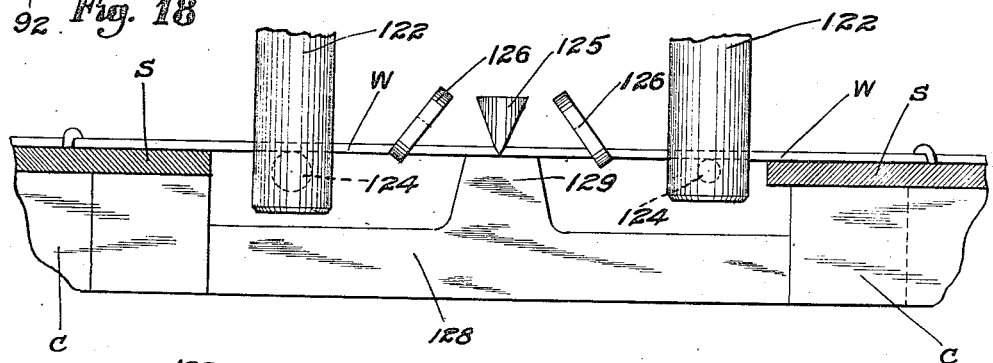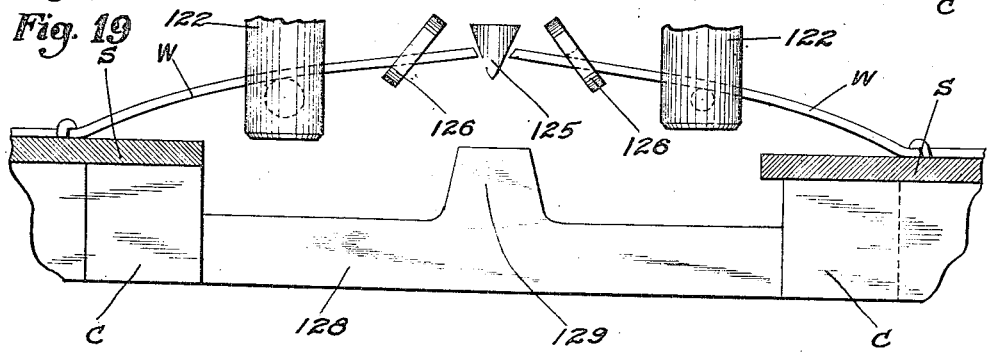

May 8, 1923.

H. J. KOCH

WIREBOUND BOX MACHINE

Filed Nov. 11, 1918 15 Sheets-Sheet 15

1,454,518

Inventor:
Henry J. Koch

By Emery Booth Janney & Varney
Atty's.

Patented May 8, 1923.

1,454,518

UNITED STATES PATENT OFFICE.

HENRY J. KOCH, OF CHICAGO, ILLINOIS, ASSIGNOR TO WIREBOUNDS PATENTS COMPANY, OF KITTERY, MAINE, A CORPORATION OF MAINE.

WIREBOUND-BOX MACHINE.

Application filed November 11, 1918. Serial No. 262,027.

*To all whom it may concern:*

Be it known that I, HENRY J. KOCH, a citizen of the United States, and a resident of Chicago, county of Cook, and State of Illinois, have invented an Improvement in Wirebound-Box Machines, of which the following is a specification.

This invention relates to machines and methods for use in making wirebound boxes or box parts having wires provided with fastening means for joining said wires, or connecting adjacent box sections, or other purposes.

Among other objects, the invention is intended to provide a mechanism for supplying such fastening means in correct relation to the work as it is manufactured.

The nature of the invention will be clearly understood by reference to one form of machine embodying the invention, adapted for producing work equipped with one convenient form of fastening means, both of which are shown for illustration in the accompanying drawings.

In said drawings:

Fig. 4 and Fig. 5 are detail plan and side views of a stop-mechanism functioning in control of the feed.

Fig. 6 shows certain elements of said stop-mechanism.

Fig. 7 is a sectional plan view of a side portion of the machine.

Fig. 8 is a side elevation of the front end of the machine, viewed from the opposite side of Fig. 1.

Fig. 9 is a plan view of the front end of the machine, showing the fastener-supplying mechanism.

Fig. 10 is a sectional side view showing one unit of the fastener-supplying mechanism.

Figs. 11 and 12 are vertical sections, taken at right angles to each other, of a portion of one fastener-supplying unit.

Figs. 13 and 14 are horizontal sectional views of said unit on different planes.

Fig. 15 is a side view of a portion of the machine, showing a staple-wire cut-out mechanism.

Fig. 16 is a detail view of a certain cam plate which is broken away in Fig. 10.

Figs. 17 to 22 inclusive are a series of detail views representing successive phases of operation of a fastener-supplying unit.

The illustrative machine is of the type in which a conveyer receives assembled box sections, in proper relation to form a blank or blanks, and advances the assembled work beneath a gang of binding-wire applying and stapling mechanisms which staple the sheets and cleats of the box sections together while securing continuous lengths of binding wires thereto, the materials being stapled at intervals depending upon the relative progression of the work between successive operations of the staplers.

Figure 21:
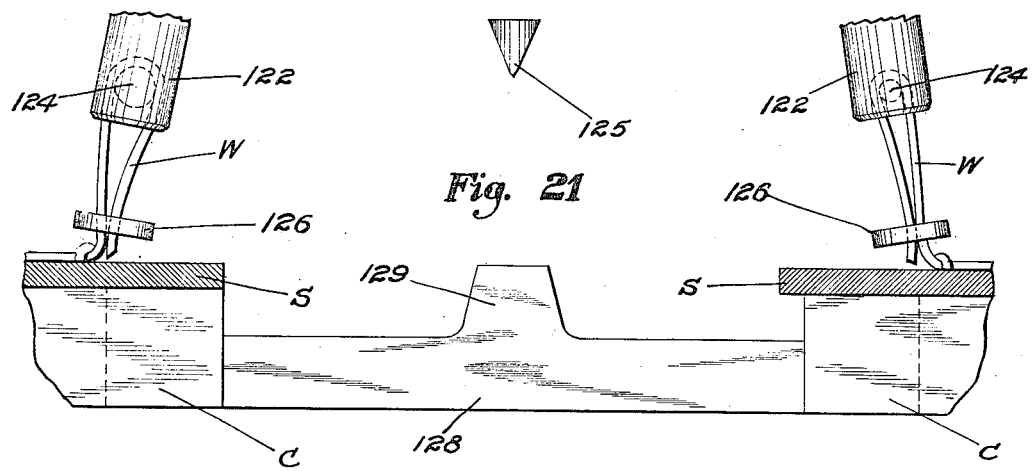
Figure 22:
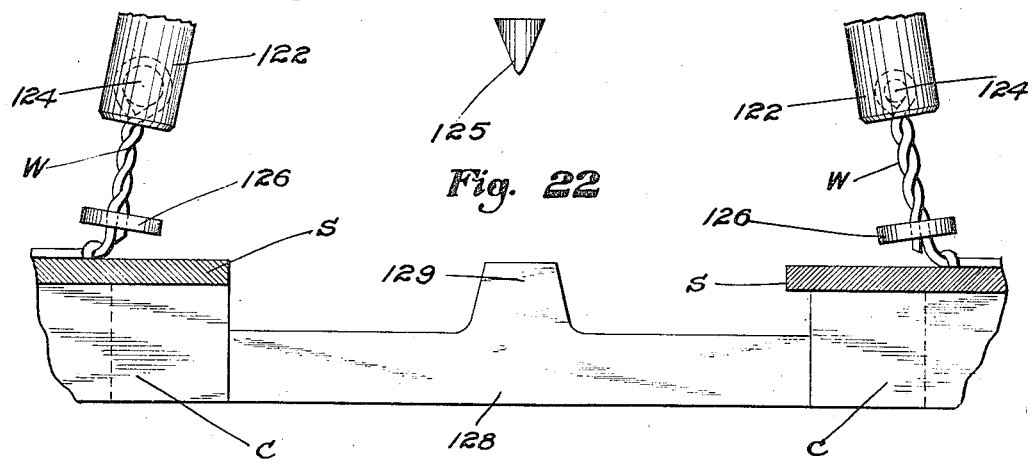

As an organized unit of the machine, it also contains a mechanism for serving the binding wires between the box sections, as they are successively being made, and supplying the free ends of the wires with fastening means, such for example as fasteners of the character shown in Fig. 22. One of the illustrative fasteners may be inserted through the other, pried and bent over for tensioning and connecting the ends of the wires in completing their continuity around the box made from the folded blank. Figs. 17 to 22 illustrate a process of formation of the fastener devices.

The general organization of the machine, which further includes devices for controlling the relationship of the work and stapling and fastener-supplying mechanism will be first described.

Figure 1:
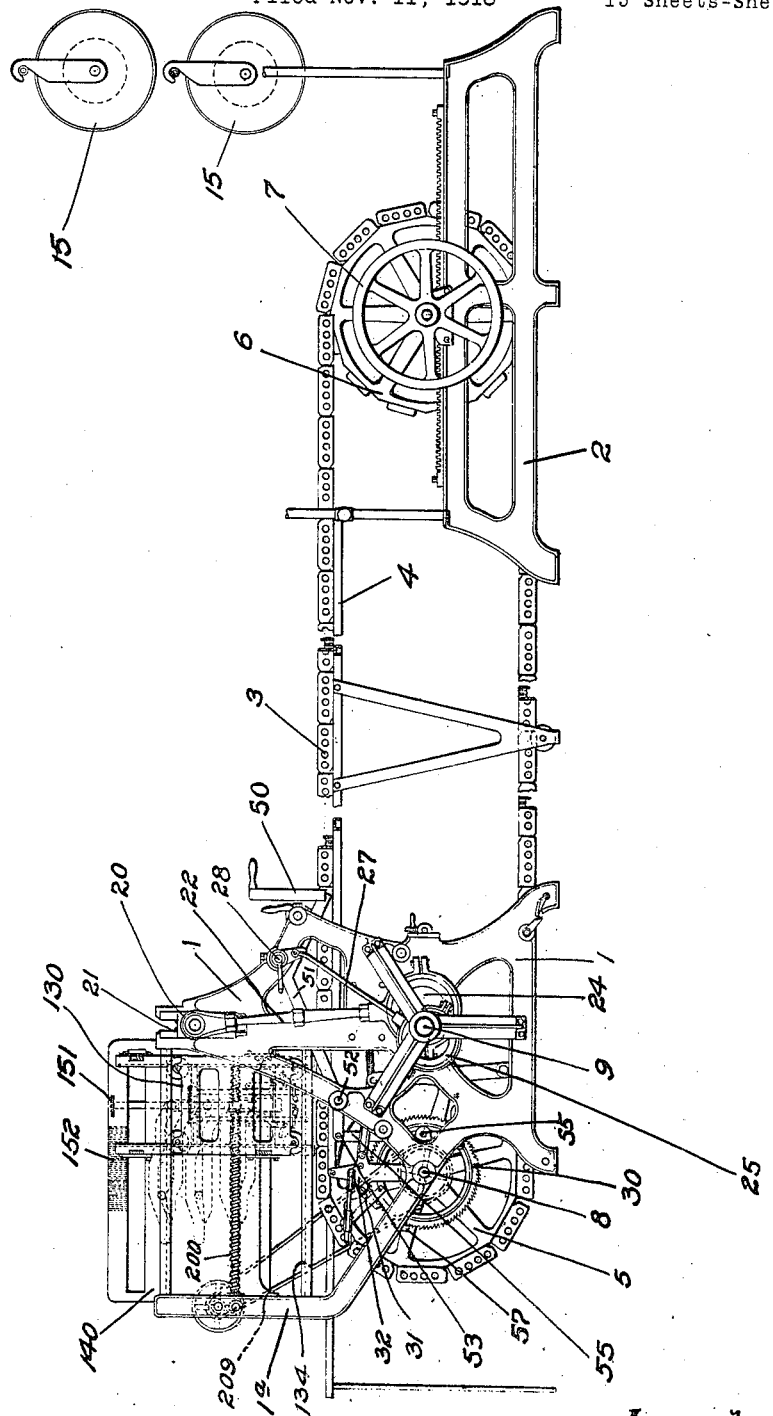
Fig. 1 is a side elevation of an approved type of wirebound box-blank machine containing one embodiment of my invention.
Figure 2:
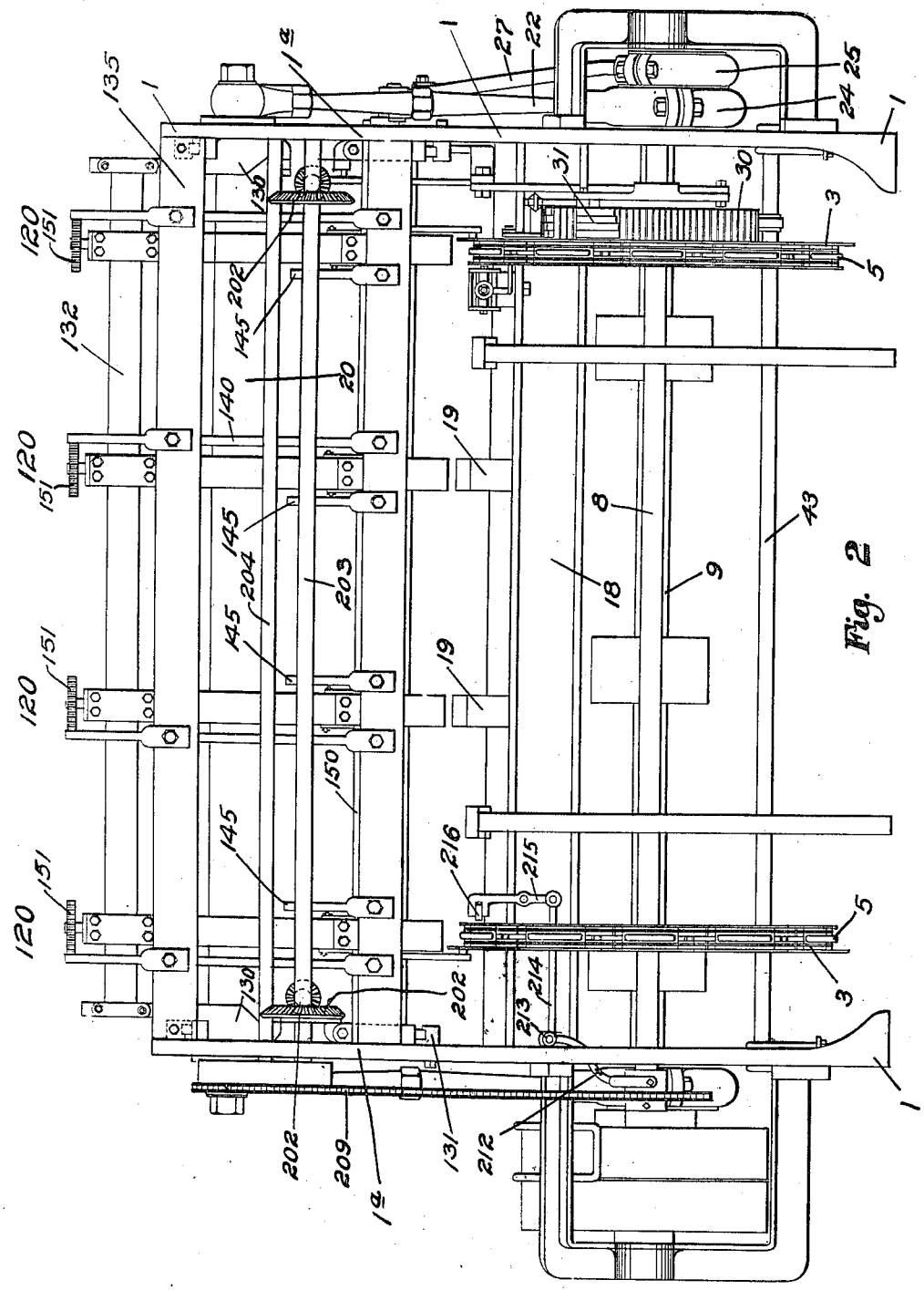
Fig. 2 is a front end elevation.

The work-conveyer, as shown in Figs. 1 and 2, comprises a pair of link side chains 3, running on the horizontal guide rails 4, and trained around the driven sheaves 5 and idle sheaves 6 mounted respectively in the front and rear side frames 1 and 2; the idle sheaves being preferably adjustable, by means of a rack and gear controlled by the hand wheel 7, to permit varying the lengths of the chains to suit the manufacture of different lengths of box blanks. The conveyer shaft 8 is driven as hereinafter described from the main shaft 9.

The conveyer chain links are appropriately formed to receive the cleats of the box sections, which are assembled thereon by placing cleats in pairs on the chains and laying sheets of side material thereacross.

Suitable spacer blocks, 10, 12 and 13 (Figs. 5, 7 and 17) are affixed at intervals to links of the conveyer chains for holding the respective blanks and sections thereof in proper spacial relation on the chains.

With the progression of the work, a plurality of continuous lines of binding wire, drawn from supply reels 15, are introduced in proper relation to the box-sections to be stapled thereto, the wires being led by unseen guide rollers under the respective staplers, in proximity to the work, and being pulled along with the work by virtue of their attachment thereto at preceding points.

Figure 3:
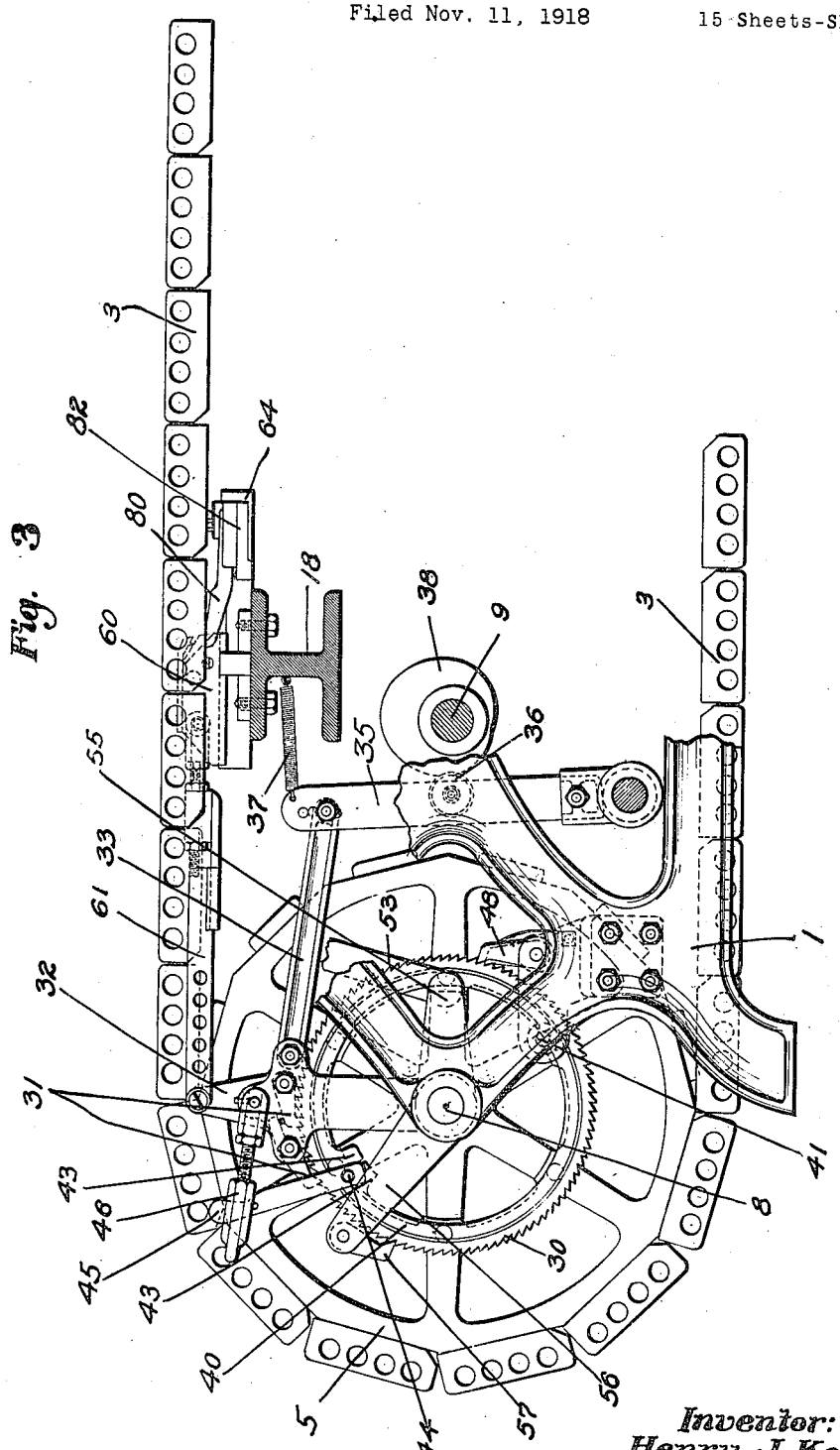
Fig. 3 is a sectional side elevation of a work-conveying and conveyer-feeding mechanism.

The staplers, not specifically shown, are arranged between the front side frames 1, and operate directly over the cross frame beam 18 shown in Fig. 3, which beam may support anvils 19, shown in Fig. 9, for coaction with the intermediate staplers in order to clinch on the under side of the sheets the staples driven over the wires running between the cleats. The other wires, alined with the cleats, will be stapled through the sheets thereto.

Staplers of suitable character are disclosed, for example, in the patent to Thompson 1,258,625 dated March 5, 1918. These are combined staple formers and drivers, adapted at every operation to cut and form staples from staple stock wire, and to drive the same over the respective binding wires into the work.

The staplers are operated, as shown in Figs. 1 and 2, by the vertically-reciprocating cross-head 20 working in guides 21 in the side frames 1, the said cross-head being operated by pitman 22 from eccentrics 24 on the main shaft 9. Another eccentric 25 on said shaft operates through rod 27 a ratchet mechanism 28 for intermittently working the staple stock wire feed-rolls, not shown.

It will be understood that the downward or driving stroke of the staplers occurs during an intermittent pause in the movement of the work, and the upward or inoperative stroke during relative movement of the work, the extent of which movement determines the spacing between adjacent staples.

By regulation of the conveyer movements, through automatic means as hereinafter described, the staples are positioned on the box blanks as desired, skipping the spaces between the blanks and individual sections.

Movement of the conveyer is derived from a ratchet feed, shown in Fig. 3, comprising a ratchet-wheel 30 on sheave 5, engaged by spring-pressed pawls 31 carried by the oscillating driving arm or lever 32, which is operatively connected by a link 33 with a lever 35. Said lever 35 has a roller 36 against which operates a cam 38 on the main shaft, the lever being held toward the cam by the spring 37. At every revolution of the cam, the feed pawls engage and turn the ratchet wheel, advancing the conveyer a corresponding amount.

A brake, to assure stopping the conveyer at the end of the feed stroke, is provided by an expansible brake shell 40, within the rim of the ratchet wheel. The brake-shell is secured to a bracket 41, and its free ends are provided with lugs 43 adapted to be spread apart by a spreader attached by a pin 44 to a lever 45 connected by a link 46 to the ratchet driving arm 32.

Backward movement of the ratchet wheel during the inoperative stroke of the driving arm 32 is prevented by a retaining dog 48 pivoted on said bracket.

There is also provided a manually-operable means to enable the operative to move the conveyer independently for initially adjusting the work relative to the staplers or causing any arbitrary feed movement at will. This comprises a hand lever 50 (Fig. 1) formed as an extension of lever 51, which is fulcrumed at 52 to the machine frame and connected by a link 53 with one arm 55 of an angle lever rockingly mounted on the shaft 8 and having its other arm 56 provided with a gravity pawl 57 for engagement with the ratchet wheel.

As stated, the movements of the conveyer are automatically regulated for controlling the disposition of the staples on the work and skipping the spaces between the box sections and blanks. The illustrative mechanism accomplishes this function by variably limiting the backward reach of the feed pawls 31. For this purpose, the ratchet-driving arm 32 is connected by the rod 61 and pivoted connector-head 62 to a reciprocating pawl-carrier 60, shown in Figs. 4 and 5, slidable on a stationary rack plate 64 and having a set of pawls 65 controllably coactive with the rack teeth 66. The extent of backward movement of the pawl-carrying slide 60 determines the inoperative stroke of the ratchet driving arm, and accordingly regulates the working stroke and thus determines the distance the conveyer moves forward at each cycle of the machine.

Said pawls 65, pivoted in the slide on the bolt 68, and depressed by the springs 69 under an extension of the top plate of the slide, are normally upheld from the rack teeth 66 by a trigger 70 arranged crosswise under the pawls. This trigger, shown in detail in Fig. 6, has full and cutaway portions 72 and 73, the full portions 72 being normally under the cutaway portions 74 of the pawls and thereby holding the latter clear of the rack teeth. The trigger is maintained in this position by a leaf spring 75 but is adapted to be shifted endwise to bring the recesses 73 under the pawls, allowing them to drop into engagement with the rack teeth and thus stop the backward movement of the slide and consequently limit the inoperative stroke of the ratchet driving arm 32.

For normal feed movements of the conveyer, the shifting of the trigger to drop the pawls is effected by a trip lever 80 having a cam surface 81 in the path of and engaged by the bevelled nose 77 of the trigger as the pawl-slide moves backward with the inoperative stroke of the ratchet-driving arm 32. Upon the ensuing forward stroke, the pawls will be raised clear of the trigger by a raised surface 67 on the rack plate, allowing the trigger to snap back to its normal pawl-elevating position.

As so far described, the work-conveyer receives a uniform step-by-step feed, for regularly spacing the staples on the box sections. The normal spacing interval may however be changed, more or less, by adjusting the relation of the trigger-trip 80 to the trigger 70. For this purpose the trip lever 80 is carried by a slide-block 82 adjustably secured by bolt 83 on the rack plate. A spring 85 seated in said block under the trip lever holds it up in the path of the trigger. The trip lever is provided with a further cam surface 117 for engagement by certain hereinafter mentioned controlling members to depress the trip lever.

For regulating and, if necessary, varying the feed to skip the blank joints, and to locate certain staples at desired points on the blank, the feed control normally exercised by the trigger trip 80 is occasionally assumed by other successively presented trips or controlling members, correlated with relative positions of the work and stapling mechanism, and adapted to cause arbitrary feed movements to bring the work to desired stapling positions. Said controlling members in the illustrative machine are carried by the various spacer blocks 10, 12 and 13 (Figs. 5, 7 and 17) which position the box materials on the conveyer chains, and are shown as pins 90, 92 and 93, which are definitely related to said spacer blocks and may be adjustably secured thereto. These function in locating the staples which come nearest the forward and rear edges of the box sections, while the remaining staples are satisfactorily placed by appropriate adjustment of the normal feed.

The travel of the conveyer brings said spacer blocks with their controlling members successively abreast of the rack plate 64 (Fig. 5), and each in turn rides upon and displaces the trigger trip 80 and in its stead assumes control of and operates the trigger 70; thus causing arbitrary feed steps either to locate staples definitely or to skip the spaces between the box sections or blanks.

Fig. 5 shows, in dotted lines, one of the spacer blocks 10 used between adjacent sections of a blank, there being a number of such spacers for every blank. Its controlling pin 90, in the manner above explained, functions to locate the last staple of the box section ahead of or preceding that spacer block, and the ensuing normal feed step, determined by the trigger trip 80, will correctly locate the first staple of the following section.

Fig. 17 shows spacer blocks used between successive blanks, the block 12 having lateral lug 12$^a$ and upstanding lug 12$^b$ for engaging respectively the rear end of the cleat C and the rear edge of sheet S of the last section of one blank; and the block 13 having screw 13$^a$ and upstanding lug 13$^b$ for engaging respectively the front end of the cleat C and the front edge of sheet S of the next blank. It will be noted that the screw 13$^a$ positions the first cleat of the blank and that by replacing the screw 13$^a$ with one of another size, the relation of the forward edge of the sheet to the cleat may be modified as desired.

Block 12, through its controlling member or pin 92, functions similarly to the intermediate spacer blocks, in that it determines the positioning of the last staple of the blank. The block 13, however, has its controlling pin 93 so located as to cause an arbitrary feed step one or more normal feed steps ahead of the desired position of the first staple of the following blank, and the ensuing normal feed will correctly locate that staple.

Thus the work is irregularly advanced, the step movements being controlled for definitely positioning the first and last staples of each blank, and of each box section, while the placing of the intermediate staples is determined by proper adjustment of the normal feed.

Inasmuch as an arbitrary feed step occurs between the driving of the last staple of one blank and the driving of first staple of the next blank, it is desirable to interrupt or nullify the intervening operation of the staplers, which may be done by depriving them of feeding wire. For this purpose the mechanism shown in Fig. 15 is provided in connection with the ratchet mechanism for operating the staple stock wire feed-rollers. On the shaft 100 of said feed rollers is the ratchet wheel 101. The pawl 102 for working said ratchet is carried on an arm 103 operated from the main shaft by the rod 27, driven from eccentric 25 (Fig. 1). To a stationary bracket 106 is pivoted a detector finger 107 normally bearing upon the sheets S of the box sections. Whenever the detector drops into a space between two blanks, it moves therewith an arm 108 carrying a pin 109 in the slot 110 of the plate 112, hung from a bracket on the stapler-operating cross-head 20. This swings said plate 112 to the left and causes a pin 113 thereon to engage upon the next up-stroke with the plate 114 on a lever 115, lifting the latter and thereby rotating a cam 104, which is loose on the ratchet shaft, causing said cam to engage a pin 105 on the pawl 102 and throw out the latter.

By this operation the staples which would otherwise be formed and theoretically driven between the blanks are eliminated; the staplers still operating but being deprived of feed wire.

*Fastener-supplying mechanism.*

As previously stated, the box blanks manufactured on the illustrative machine are to have their respective binding wires provided with terminal fastening means for connecting them when the box blank is folded into shape.
These fastening means are supplied to the wires by mechanism arranged forward of the staplers and automatically coming into action, at precisely the right times and right relation to the box materials, after the staples have been driven in one blank and the stapling has commenced upon another blank; said mechanism operating upon the free portions of the wires joining the blanks first to sever them, midway or otherwise definitely, and then to supply the severed ends with the desired fastening means.

Referring to Figs. 1, 2, 8, 9 and 10, said mechanism comprises a number of fastener-supplying units 120, corresponding to the respective wires to be supplied with fastening means.

The character of fastening means to be supplied by this specific mechanism is shown in Fig. 22. This fastener consists of a bight formed directly on the wire binding itself by having the legs of the bight twisted together.

The operation of one of the fastener-supplying units is indicated in Figs. 17 to 22 inclusive; such units being in this instance wire bending and twisting mechanisms.

Figure 12:
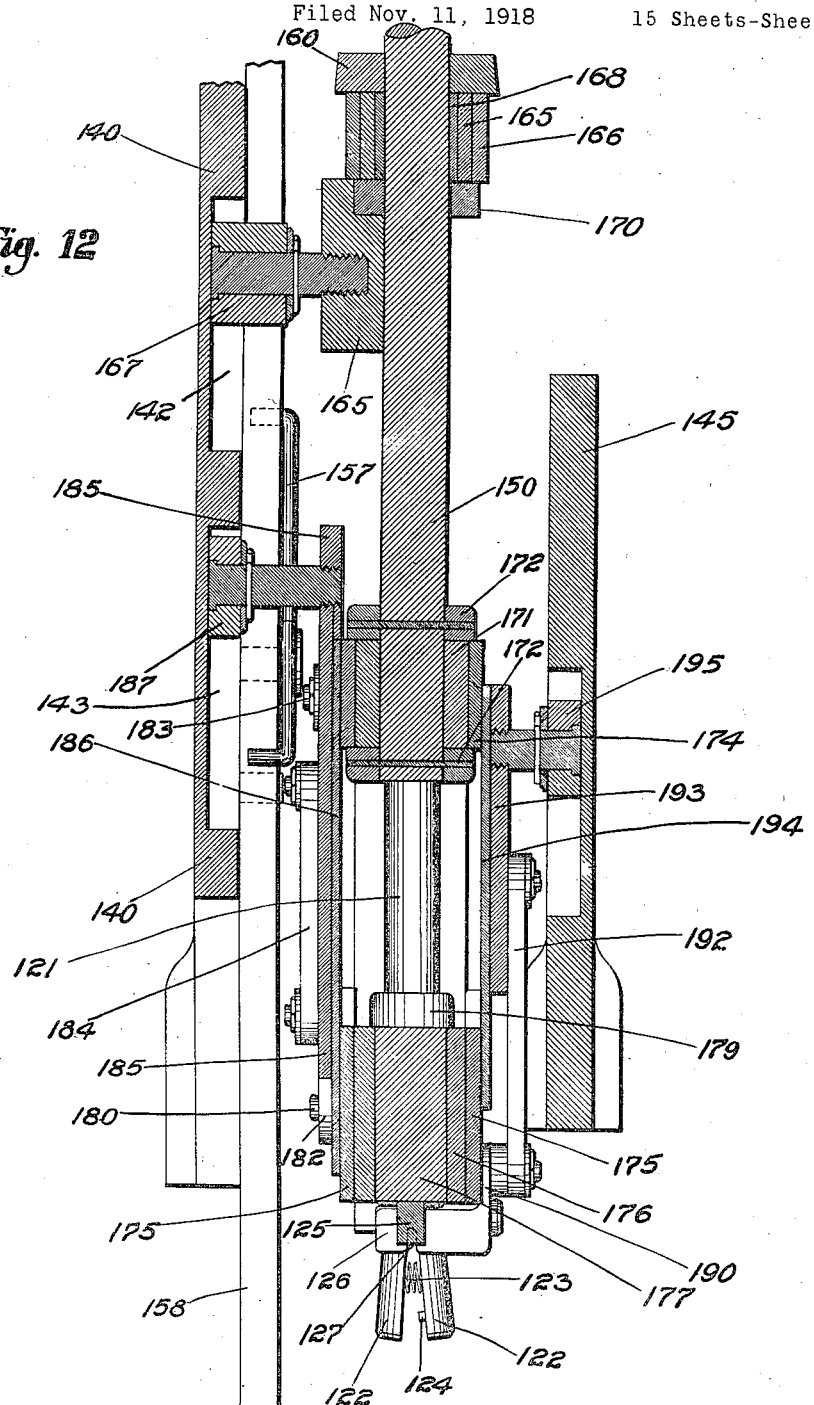
Figure 13:
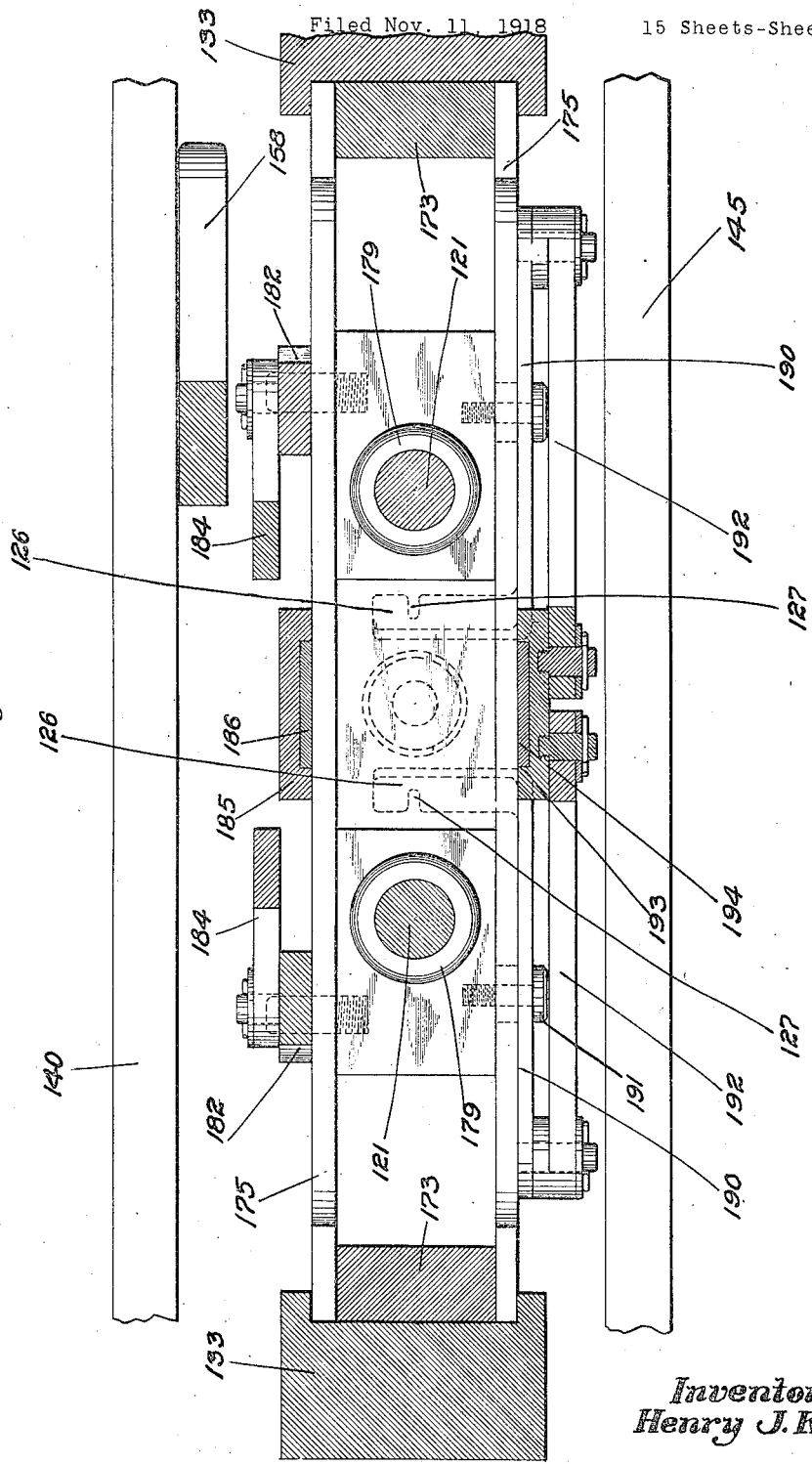
Figure 20:
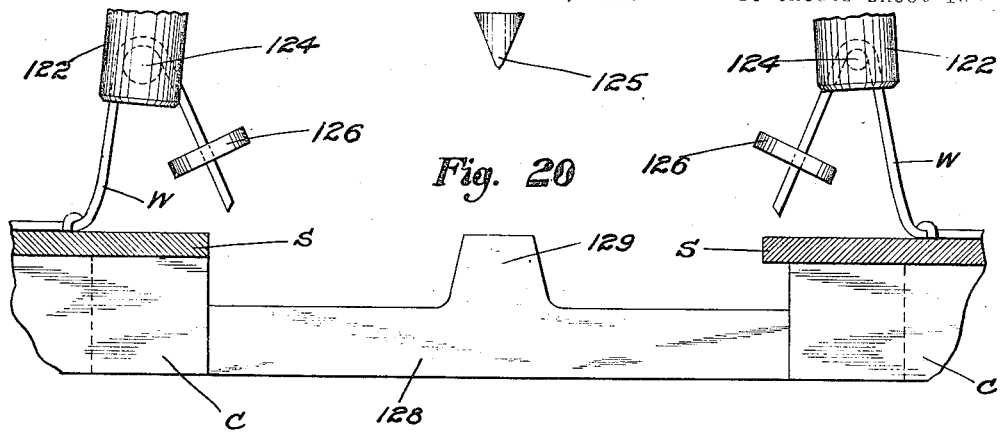

Each bending and twisting mechanism, as shown in Figs. 11 and 12, includes a pair of vertically-arranged rotary twister shafts 121 provided at their lower ends each with a pair of hinged jaws or fingers 122 distended by a spring 123, one of the jaws of each pair having a stud 124. Between the twisters is a wire cutter 125 and a pair of notched wipers 126. This group of devices is normally above the plane of the work, the distended twister jaws 122 and the notches 127 of the wipers 126 being in alinement immediately over the wire.

Referring to Fig. 17, a spacing element 128 is interposed between the ends of the cleats of the two blanks, said spacer being bolted to the conveyer chain and provided with a raised anvil 129. When in the progress of the work the anvil 129 comes immediately under the knife 125, the operation of the bending and twisting mechanism is about to commence.

In operation, the group of devices drops to the position shown in Fig. 18, bringing the knife against the anvil to sever the wire, and bringing the distended twister jaws 122 over the wire, with their studs 124 below the wire, and causing the notches of the wipers 126 to engage the wire. In this movement the twister jaws immediately close together so as to catch the wire under the studs 124. The group of devices is then elevated, and in ascending the twisters and wipers are swung outwardly, so that they cooperate in bending the wires over the studs and the wipers by a continued swinging movement engage and hold the legs of the bight as shown in Fig. 21. Then the twisters are rotated to twist the legs of the bight, while still held by the wipers as shown in Fig. 22. The wipers are then retracted, the twister fingers separated to release the bights from the studs, and the group of devices is further elevated to allow the work to proceed and then returned to the original position shown in Fig. 17.

In performing these operations the wire manipulating elements may move with the work until the fastening means are provided on the ends of the wires, being automatically returned to position to operate upon the wires of the following blank; thus avoiding interruption or retardation of operation of the machine.

It will be noted that the two forming studs or pins 124 are of different sizes, the object being to form, at opposite ends of the blank, fastening means one of which can be inserted through the other and pried, by means of any suitable tool engaging the smaller eye of the inserted fastener, so as to tension the wires around the box, after which the inserted fastener may be bent or hooked over the other to complete the fastening.

The several movements of the parts above described, which are desirable when the illustrative form of fastening means is to be supplied, may be produced in any practicable manner, as, for example, by the illustrative means now to be described.

The several fastener-supplying units are mounted in a carriage 130 (Figs. 1 and 8), comprising side members connected by transverse members 132, the latter connected by vertical channeled members 133 constituting guides in which the respective binding and twisting mechanisms are vertically slidable (Figs. 9 and 10). Said carriage 130, provided with rollers 131, runs on longitudinal tracks 134, supported by the four cross beams 135 in the side frames 1 and forward extensions 1ª thereof.

Beside each unit is a stationary cam plate 140, best shown in Fig. 10, having a number of cam paths 141, 142, 143, and on the opposite side of each unit a smaller cam plate 145, shown in Fig. 16, having a cam path 146. These cam paths actuate various rollers, hereinafter mentioned, attached to various elements of the bending and twisting mechanism, as the carriage moves them forwardly with the work and returns.

As shown in Fig. 10, each bending and twisting unit has a central vertical operating shaft 150, carrying at its upper end a pinion 151 for engagement with a rack 152 on the cam plate 140. Said shaft is swiveled to a block 154 provided with a roller 155 for engagement with the cam path 141.

Said roller 155, attached as stated to the central operating shaft, is normally supported in a seat 156 on the upper end of a trip lever 158 mounted preferably in a stationary part of the machine frame, or to the fixed cam plate, and held in position by the spring 157. The operating shaft is thus suspended from the upper end of said trip lever. The lower end of said lever (or at least the lever of one unit, with which the levers of other units may be suitably connected) extends below the plane of the work conveyer chain, on which are arranged at intervals pins 159 which at proper periods, when the fastener-supplying mechanism is to perform, engage and trip the said lever, thus releasing the roller 155 and allowing the shaft 150, together with the other mechanism suspended therefrom, to drop. Thereupon the mechanism is moved forward with the work, and back, for actuation by the stationary cams.

Referring to Figs. 11, 12, 13 and 14, the central shaft 150 is geared by splined pinion 160 with pinions 161 on the twister shafts 121. The twister shaft bearings 162, in which said shafts are held by the pinions 161 and collars 163, are hinged at 164 to a block 165 of a vertically slidable frame 166, guided in the ways 133, which block carries a roller 167, for engagement with the cam path 142. The hinging of the twister shaft bearings is to permit the swinging of the twisters, the pinions 161 of which are somewhat conical in form to accommodate the swinging movement. The central shaft is slidable as well as rotatable in the block 165 (there being a bushing 168 to compensate for the spline 169) and a collar 170 pinned on said shaft limits its relative upward movement in the block. Thus the slidable frame 166 with the twister shafts is suspended on the central shaft, though the latter can nevertheless be moved down through the block 165 when the said frame is independently held.

At its lower end the central shaft 150 is journaled in a block 171, embraced between collars 172 pinned on said shaft. Said block 171 is secured in another vertically slidable frame 173, also working in the ways 133, said frame comprising upper side plates 174, and lower side plates 175, the latter having secured therebetween a block 176 containing the stock 177 of the hardened plunger knife 125. This lower slidable frame carries operating devices for closing the twister jaws 122, and for swinging the twisters and also the wipers 126. Said devices with the knife are thus collectively suspended from and rise and fall with the central shaft 150.

For closing the twister jaws, the lower ends of the twister shafts are surrounded by blocks 178, adapted to be lowered over and close said jaws, their upward motion on said shafts being limited by the collars 179. Said jaw-closing blocks are also adapted to swing outward with the twister shafts. For imparting such swinging motion, the said blocks 178 are connected by pins 180, ridable in slots 181, to the lower ends of levers 182 pivotally connected at 183 to the upper plates 174 of the lower slidable frame. Said levers are connected by links 184 with an operating slide 185 guided on vertical member 186 and provided with a roller 187 for engagement with cam path 143.

The wipers 126 are carried by levers 190 pivoted at 191 to the movable jaw-closing blocks 178, whereby said wipers will swing with the twisters, but for giving them necessary independent movement the said wiper-carrying levers 190 are connected by the links 192 with an operating slide 193 guided on vertical member 194 and provided with a roller 195 for engagement by the cam path 146 of the cam plate 145 shown in Fig. 16. From an inspection of Fig. 10 it will be apparent that the weight of the slide 193 will hold the wipers normally against the bottom of the knife block 176.

Reviewing the mechanism as so far described, it will be seen that the trip lever 158 (Fig. 10) normally suspends the central shaft 150, from which is suspended the entire bending and twisting mechanism; namely, the frame 166, through which the central shaft can slide, carrying the twister shafts 121 (Figs. 11 and 12), and the lower frame 173, attached to said central shaft, carrying the plunger knife 125, the twister jaw-closing blocks 178, the slide 185 for operating the links to swing the twisters, and the slide 193 for controlling and operating the notched wipers 126. Also that the several rollers attached to these devices are engaged by the respective cam paths of the stationary cam plates 140 and 145 to be actuated thereby as the carriage containing the mechanism moves forward and back. Of cam plate 140, the first or uppermost cam path 141 will actuate the roller 155 (Fig. 10) on the central shaft, thus controlling its vertical motion and that of the lower vertically-slidable frame 175 carrying the twister-jaw blocks, etc. The second cam path 142 will actuate the roller 167 of the upper vertically-slidable frame 166 carrying the twister shafts. The third or bottom cam path engages the roller 187 attached to the slide 185 on the lower frame for swinging the twisters. The opposite slide 193 on said lower frame, which controls the wipers, has its roller 195 engaged by the cam plate 146 of the smaller cam plate 145.

The several more or less similar cam paths, as observed from Figs. 10, 11 and 16, extend from right hand vertical portions, that of cam path 142 being less than the others, in which vertical portions the several rollers can drop when the roller 155 is released from the trip lever 158. From the bottoms of the vertical portions the cam paths variously ascend, then continue horizontally and at the left are provided with switches 147 adapted to be passed by the rollers in switching from the lower to the upper runs of the paths which return by ascents, horizontal and descents to the upper ends of the right hand vertical portions. The purpose of the switches is to cause the rollers to follow the upper runs on the return motion of the carriage 130.

The operation will now be obvious: Upon tripping the lever 158 (Fig. 10), the entire mechanism including the central shaft 150 drops to the extent permitted by the vertical portions of the cam paths, bring the several wire manipulating devices to the position shown in Fig. 18 and causing the knife 125 to cut the wire W. The drop of the twister-shaft carrying frame 166 being limited by the shorter vertical portion of cam 142, the central shaft and remaining parts carried thereby drop further; consequently the blocks 178 in the lower frame move down over and close the twister jaws, and the severed wires are thus engaged by the studs 124 and notches of the wipers 126 in condition for the bending and twisting operation as previously described.

At this stage, the travel of the carriage having commenced, the cams referred to variously lift and actuate the several rollers, with the different parts carried by the rollers, to move the wire manipulating devices through the evolutions indicated in Figs. 19 to 22. The upper cam path raises the central shaft 150 and thus the knife 125 and the lower frame 173 with its associated parts. The second cam path simultaneously raises the twister shafts 121 without changing their relation to the blocks 178, so that the twisters remain closed. The lower cam at first raises the slide 185 to maintain the position of the links 182 and 184, but after the roller 187 passes the small ascending incline of said cam path and runs on the horizontal, while the rest of the mechanism is still being raised by the more extensive inclines of the two upper cam paths, the links 184 operate or spread the levers 182 and swing out the twisters. Concurrently with this movement the cam path of the smallest cam plate 145 (Fig. 16) raises by its steeper incline the slide 193, rocking the wiper-carrying arms or levers 194 which, as stated, are pivoted to the twister-blocks 178; and a continued movement brings the wipers to the position shown in Fig. 22, whereupon, and during the common horizontal runs of the cam paths the central shaft 150 is turned by its pinion 151 meshing with the rack 152 and rotates the twisters to produce the fastenings. Continued actuating the rollers by the cam paths cause relative lifting of the central shaft and consequent raising of the blocks 178 and opening of the twister jaws, thus releasing the twisters from the fastening means or bights supplied on the wires, about which time the wipers commence also to withdraw from the wires; and the parts are further elevated and by the upper runs of the cam paths returned smoothly to their original or normal position.

The various rollers having traversed the circuits of the cam paths, as the carriage 130 of the mechanism moves forwardly and back, will at the end of the operation have resumed the positions shown in Fig. 10; the upper cam path 141 having carried the roller 155, sustaining the central operating shaft 150, back into its seat at the upper end of the trip lever 158.

The back and forth travel of the carriage 130, containing the several bending and twisting units, is effected by feed screws 200, shown in Figs. 8 and 9. These feed screws, journalled at their ends in fixed bearings, and threaded through the bracket nuts 201 of the carriage, are geared by the beveled pinions 202 with the shaft 203. On a counter shaft 204 is a sprocket 205 (Fig. 8) having on its hub a multilated pinion or segmental gear 206 and in its rim an internal segmental gear 207, each of these elements being adapted in alternation to mesh with a pinion 208 on the screw-operating shaft 203. The sprocket 205 is connected by the chain 209 with a sprocket wheel 210 upon the conveyer shaft 8. The sprocket 210 is alternately connected and disconnected with the conveyer shaft 8 by means of any suitable clutch 211 operated by the lever 212 which is connected by the rod 213 to the rod 214 (Fig. 2) which in turn is connected to and operated by the lever 215 pivoted upon the cross frame member 18 and carrying at its upper end a roller 216. Whenever the lever is operated, as is done by an extended cam projection 217, on the conveyer chain, the clutch connects the sprocket 210 to cause its operation for a portion of a revolution, and that of sprocket 205, for one revolution. This will result in a slow advance and return of the carriage 130 inasmuch as their feed screws 200 are operated first by the hub pinion 206 and then by the internal gear 207 of sprocket 205 to complete a revolution.

Thus the carriage, being properly geared with the conveyer shaft, will move the fastener-supplying mechanism forwardly in unison with the work, while the mechanism is operating on the wires; and the carriage will then return the mechanism to position for operation upon the wires of the next blank.

One of the lugs 217 which starts the feed of the carriage comes into action simultaneously with or nearly so and in definite relation to the lug or controlling pin 159 (Fig. 10) on the conveyer which releases the trip lever 158 of the bending and twisting mechanism, the latter lug 159 being definitely related to anvil 129 on the work spacer 128 (Fig. 17) to trip the lever 158 at the proper time to drop the knife immediately over the anvil; such operation followed in proper sequence by the travel of the carriage. Both the lugs 217 and 159, of which there are a number spaced along the conveyer chain for successive presentation to cause functioning of the fastener-supplying mechanism upon the wires of successively made blanks, should accordingly be adjustably secured on the conveyer to permit setting them in their proper relative positions which may vary with the lengths of blanks, or number of sections per blank, as well as with the spacing between blanks. The latter of course is controlled by the adjustment of the work-spacer blocks 12 and 13 (Fig. 17), and for any variation in the distance between these, or in the distance between the cleat ends of adjacent blanks, correspondingly variable length spacers 128 may be used. Whatever the determined spacing, the last and first staples of the respective blanks are definitely positioned relative to the rear and front ends of said blanks by the feed-control exercised by the controlling pins 92 and 93; while the trip controlling lugs 159 and carriage feed controlling lugs 217 will always bear such a relation to said spacer blocks 12 and 13, and consequently to the controlling members 92 and 93, that the fastening means supplied as shown in Fig. 22 will be in determined relation not only to the box blank edges but also to the staples adjacent those edges. This relationship may be more or less varied as desired by altering the length of the anvil-carrying spacers 128, and correspondingly adjusting the other parts, which adjustment as indicated will not interfere with the predetermined positioning of the staples.

I claim:

1. A machine for use in box manufacture comprising, in combination, wire-attaching mechanism to secure wire on a box part, work-positioning means, fastener-supplying mechanism, means for presenting the wired box part thereto, and means for operating said mechanism to provide wire on said box part with fastening means.

2. A machine for use in box manufacture comprising, in combination, wire-attaching mechanism to secure wire on a box part, work-positioning means, and automatic fastener-supplying mechanism to provide said wire with fastening means.

3. A machine for use in box manufacture comprising, in combination, means for feeding box materials, wire-applying and stapling mechanism to secure wire to such materials, and fastener-supplying mechanism arranged and operable to provide said wire with fastening means.

4. A machine for use in box manufacture comprising, in combination, means for feeding box materials, wire-applying and stapling mechanism to secure wire to such materials, fastener-supplying mechanism, means controlling presentation of the work thereto, and means for operating said mechanism to provide said wire with fastening means in a determined relation to materials.

5. A machine for use in box manufacture comprising, in combination, means for feeding box materials, wire-applying and stapling mechanism to secure wire to such materials and automatic fastener-supplying mechanism constructed and arranged to provide wire on such materials with fastening means.

6. A machine for use in making wire-bound boxes comprising, in combination, means for maintaining an assembly of box parts, including cleats, in cooperative foldable relationship; means to secure binding wire to said box parts including the cleats; and fastener-supplying mechanism and means to operate the same to provide such wire with fastening means.

7. A machine for use in box manufacture comprising, in combination, mechanism to staple binding wire to box parts, means for determining the position of a staple relative to the edge of a box part, fastener-supplying mechanism to provide said wire with fastening means, and means for relatively positioning said fastener-supplying mechanism and work to provide said fastening means on the wire in a desired relation to said staple.

8. A machine for use in box manufacture comprising, in combination, means to receive successive assemblies of materials for making a plurality of boxes, cooperating work-supporting, wire-stapling and step-feed mechanisms whereby continuous binding wires are secured to said successive assemblies, means to sever the wires therebetween, and fastener-supplying mechanism to provide the severed portions with fastening means.

9. A machine for use in box manufacture comprising, in combination, means to apply binding wire to a box part, means to sever the wire on the box part, fastener-supplying mechanism correlated therewith and operative to provide said wire with fastening means and work positioning means for relatively locating said severing means and box part, whereby the wire may be severed and the fastening provided thereon in desired relation to said box part.

10. A machine for use in box manufacture comprising, in combination, means to feed assembled wooden parts, including means to locate said parts, means to secure binding members upon said wooden parts and to secure the wooden parts together, means to sever the binding members, and means to supply fasteners to said severed ends.

11. A machine for use in making boxes comprising, in combination, means to feed assembled wooden box parts through the machine, including means to locate said parts, means to secure binding members upon said wooden parts and to secure the wooden parts together, means to sever the binding members between materials for different boxes or box sections, and means to supply fasteners to said severed ends, including means to position the box parts and fasteners in desired relation.

12. In a machine for use in making boxes, means for fastening together the elements of a box including box sides and binding wires, and cooperating means to supply the ends of said binding wires with interengageable fasteners.

13. In a machine for use in making boxes, means for fastening together the elements of a box including box sides and binding wires, and means to supply fasteners to said binding wires, including means to locate said fasteners in desired relation to the box.

14. In a machine for use in making boxes, means for forming a wire bound box blank having wire extensions at either end thereof, and means for supplying said extensions with cooperable fasteners.

15. In apparatus of the class described, means for applying continuous binding wire upon a series of work units, means for severing said binding wire between units, and means for providing a bight on a severed portion of said binding wire.

16. In apparatus of the class described, means for applying continuous binding wire upon a series of work units, means for severing said binding wire between units, and means for supplying said wire with a bight having its legs twisted together.

17. In apparatus of the class described, means for applying a continuous binding wire upon a series of work units, means for severing said binding wire between units, and means for providing bights on both severed ends.

18. In apparatus of the class described, means for presenting an opposed pair of wire ends each secured to a box part and means for supplying cooperative fastening means to said opposed ends.

19. In apparatus of the class described, means for presenting an opposed pair of wire ends each secured to a box part means for providing a bight on one of said wire ends, and means for providing a smaller bight on the other opposed end.

20. A wirebound box machine, comprising, in combination, means for feeding assembled box parts, stapling devices for securing said box parts, including binding wires, together, means to space adjacent ends of successive parts apart, and fastener supplying means to supply fasteners to the binding wires in the spaces between said ends.

21. A wirebound box machine comprising, in combination, means for feeding assembled box parts, stapling devices for securing said box parts, including binding wires, together, means to space materials for successive boxes, fastener supplying means to supply fasteners to binding wires in the space therebetween, said fastener supplying means travelling with the work during a fastener-supplying operation.

22. A wirebound box machine comprising, in combination, means for feeding assembled box parts, stapling devices for securing said box parts, including binding wires, together, means to space the adjacent ends of successive box materials apart, fastener supplying means to supply fasteners to the binding wires in the space between said ends, said fastener supplying means travelling with the work during a fastener-supplying operation, and means to return said mechanism for a succeeding operation.

23. In a box machine, stapling devices, means for feeding assembled box parts, including continuous binding wire, past the stapling devices, means for spacing apart the wooden elements of successive box blanks, means for severing the wire between box blanks, and fastener supplying means for supplying fasteners to an end of said binding wire, said fastener supplying means assuming control after the wire is severed and moving with said end.

24. In a box machine, stapling devices, means for feeding assembled box parts, including continuous binding wire, past the stapling devices, means for separating the assembled materials for different boxes, and means travelling with the work for performing supplementary operations thereon.

25. In a box machine, stapling devices, means for feeding assembled box parts, including continuous binding wire, past the stapling devices, means for severing the binding wire between successive box materials, and means for supplying a bight to the severed wire, said last named means operating without interrupting the progress of the work through the machine.

26. In a box blank machine, the combination of means to staple binding wire to box blanks, means for severing binding wire between successive blanks, and means for supplying cooperating fasteners to the opposed ends of said binding wire.

27. In a box machine, stapling devices, means for feeding assembled box parts, including continuous binding wire, past the stapling devices, means for spacing successive box materials, means for severing wire between such spaced materials, and means for supplying fastening means to the severed wire, including means for relatively locating the same.

28. In a box machine, means to feed assembled box materials, each assembly comprising superposed sheets and cleats, stapling mechanism for stapling binding wire upon said sheets and cleats to secure the latter together and the wire thereto, means to vary the feed to locate staples placed by said stapling mechanism, means for spacing successive assemblies, fastener-supplying mechanism to supply fastening means to the binding wires of said assemblies, and means cooperating with the fastener-supplying mechanism to locate staples in correct relative position to said fastening means.

29. The combination of a work support adapted to carry assembled sheets and cleats, means for intermittently advancing the work support, means on the work support for spacing apart the sheets and cleats for different box blanks, stapling mechanism, means for varying the feed to locate staples driven by said stapling mechanism, including means to locate the staples at the rear and forward edges of the blanks respectively, fastener-supplying means for supplying fastening means in correct relative position to said staples on the rear and forward edges of the blanks, and means for preventing the driving of staples over the binding wires between the staples at the rear and forward edges respectively of said blanks.

30. In a machine for making wirebound box blanks, a work support, feeding means for intermittently advancing the work, including means controlled by the work support for automatically varying said feed, fastener-supplying means for supplying fasteners to the work, said feeding means cooperating with the fastener-supplying means to locate said fasteners in desired relation to the work.

31. In a machine for making wirebound box blanks, a work support, feeding means for intermittently advancing the work, stapling mechanism, means to avoid stapling in predetermined regions of the work, fastener-supplying means for supplying fasteners to the work, said feeding and fastener-supplying means cooperating to supply said fasteners in regions of the work in which no staples are driven.

32. In a box machine, means for applying binding wire to box materials, and wire manipulating mechanism for engaging the binding wire between materials to provide the same with fastening means.

33. In a box machine, means to receive box elements, including binding wires, in appropriately spaced relation, means to advance the same through the machine, means for securing elements for each box including the binding wires together, means for severing the binding wire between successive box materials, a twister device, and means for causing the twister device to engage and twist a severed end of said binding wire.

34. In a machine for use in making wirebound boxes, a work support; fastener-setting mechanism for applying binding wire to box parts; and mechanism for severing the wire between box parts and supplying the same with fastening means, comprising a wire-severing knife, a twister having jaws, means for closing said jaws, and co-operative wire-engaging devices.

35. A machine for use in making boxes comprising, in combination, means for applying binding wire to box parts, fastener-supplying mechanism constructed to provide said wire with fastening means; and work-positioning means for relatively locating said mechanism and the wired box part, whereby said mechanism may provide said wire with fastening means positioned in desired relation to the box part.

36. A machine for use in making boxes, comprising, in combination, means for applying binding wire to box parts, fastener-supplying mechanism constructed to provide said wire with a bight; and work positioning means for relatively locating said mechanism and the wired box part, whereby said mechanism may provide said wire with a bight in desired relation to the box part.

37. A machine for use in making boxes comprising, in combination, means for applying binding wire to box parts, fastener-forming mechanism constructed to manipulate said wire to form thereon a means for fastening the wire to the wire of another box part; and work-positioning means for relatively locating said mechanism and the wired box part, whereby said mechanism may provide said wire with fastening means positioned in desired relation to the box part.

38. A machine for use in making wire-bound boxes comprising, in combination, a work support; fastener-setting mechanism for applying binding wire to box parts; means to cause relative progression between said mechanism and the box parts; and fastener-supplying mechanism to provide said wire with fastening means.

39. A machine for use in making wire-bound boxes comprising, in combination, a work support; fastener-setting mechanism for applying binding wire to box parts; means to cause relative progression between said mechanism and the box parts; and fastener-supplying mechanism to provide said wire with fastening means in desired relation to the box parts.

40. A machine for use in making wire-bound boxes comprising, in combination, a work support; fastener-setting mechanism for applying binding wire to box parts; means to cause relative progression between said mechanism and the box parts; fastener-supplying mechanism to provide said wire with fastening means; and means controlling the operation thereof.

41. A machine for use in making wire-bound boxes comprising, in combination, a work support; fastener-setting mechanism for applying binding wire to box parts; means to cause relative progression between said mechanism and the box parts; and fastener-supplying mechanism to provide said wire with fastening means during said relative movement.

42. A machine for use in making wire-bound boxes comprising, in combination, a work support; fastener-setting mechanism for applying binding wire to box parts; means to cause relative progression between said mechanism and the box parts; and fastener-supplying mechanism including wire-severing means for severing the wire between box parts and providing said severed ends with fastening means.

43. A machine for use in making wire-bound boxes comprising, in combination, a work support; fastener-setting mechanism for applying binding wire to box parts; means to cause relative progression between said mechanism and the box parts; and fastener supplying mechanism including wire-severing means for severing the wire between box parts and providing said severed ends with co-operable fastening means.

44. A machine for use in making wire-bound boxes comprising, in combination, a work support; fastener-setting mechanism for applying binding wire to box parts; means to cause relative progression between said mechanism and the box parts; and fastener-supplying mechanism including wire-severing means for severing the wire between box parts and providing said severed ends with fastening means adapted to detachably co-operate.

45. A machine for use in making wire-bound boxes comprising, in combination, a work support; fastener-setting mechanism for applying binding wire to box parts; means to cause relative progression between said mechanism and the box parts; and fastener-supplying mechanism including wire-severing means for severing the wire between box parts and providing said severed ends with fastening means adapted to co-operate with similar fastening means on adjacent box parts.

46. A machine for use in making wire-bound boxes comprising, in combination, a work support; fastener-setting mechanism for applying binding wire to box parts; means to cause relative progression between said mechanism and the box parts; and means to sever the wire between box parts and simultaneously provide both severed ends with fastening means.

47. A machine for use in making wire-bound boxes comprising, in combination, a work support; fastener-setting mechanism for applying binding wire to a succession of box blanks progressively subjected to the action thereof; means to space said blanks; means to sever the binding wire between successive blanks; and means to provide the severed ends of the wire with bights of different sizes whereby the same operation between succeeding blanks will provide each blank with fastening means adapted to co-operate when the blank is folded into box form.

48. A machine for use in making wire-bound boxes comprising, in combination, means to supply a fastener to the wire of a wired box part; and means to feed said box part to said fastener-supplying means.

49. A machine for use in making wire-bound boxes comprising, in combination, means to supply a fastener to the wire of a wired box part; and means for positioning said box part and feeding it to said fastener-supplying means.

50. A machine for use in making wire-bound boxes comprising, in combination, means to apply binding wire to a box part, means to supply a fastener to the wire of the wired box part; and means for causing relative movement between the box part and the fastener-supplying means.

51. A machine for use in making wire-bound boxes comprising, in combination, means to supply fasteners to a plurality of wires secured to a box part; and means to feed said box part to said fastener-supplying means.

52. A machine for use in making wire-bound boxes comprising, in combination, means to supply a fastener to the wire of a wired box part; and means to present said box part to the fastener-supplying means, including means for controlling the relative position of the box part and the fastener-supplying means at the time of a fastener-supplying operation.

53. A machine for use in making wire-bound boxes comprising, in combination, means to supply a fastener to the wire of a wired box part, including means to sever the wire, and means to present said box part to said fastener-supplying means.

54. A machine for use in making wire-bound boxes comprising, in combination, means to sever the end of a wire secured to a box part; means to supply said wire with fastening means; and means to cause relative progression between the box part and said wire-severing and fastener-supplying means to subject said box part to the wire-severing and fastener-supplying operation.

55. A machine for use in making wire-bound boxes comprising, in combination, means to sever the end of a wire secured to a box part; means to supply said wire with fastening means; and means to present said box part to said wire-severing and fastener-supplying means.

56. A machine for use in making boxes comprising, in combination, binding-wire-applying mechanism; means to cause relative progression between said mechanism and the work; and means to supply the binding wire with a fastener.

57. A machine for use in making boxes comprising, in combination, binding-wire-applying mechanism; work-feeding means; and means to supply the binding wire with a fastener.

58. A machine for use in making boxes comprising, in combination, binding-wire-applying mechanism; work-feeding means; and means operable upon the moving work for supplying the binding wire with a fastener.

59. A machine for use in making boxes comprising, in combination, binding-wire-applying mechanism; work-feeding means; and means to sever the binding wire and supply it with a fastener.

60. A machine for use in making boxes comprising, in combination, binding-wire-applying mechanism; work-feeding means; and means operable upon the moving work for severing the binding wire and supplying it with a fastener.

61. A machine for use in making boxes comprising, in combination, binding-wire-applying mechanism; means to cause relative progression between said mechanism and the work; means to supply the binding with a fastener; and means to control the operation of the fastener-supplying means.

62. A machine for use in making boxes comprising, in combination, binding-wire-applying mechanism; work-feeding means; means to supply the binding wire with a fastener; and means to control the operation of the fastener-supplying means in accordance with the passage of the work through the machine.

63. A machine for use in making boxes comprising, in combination, binding-wire-applying mechanism; work-feeding means; means to supply the binding wire with a fastener; and means correlated in movement with the work to control the operation of the fastener-supplying means.

64. A machine for use in making boxes comprising, in combination, binding-wire-applying mechanism; work-feeding means; means to supply the binding wire with a fastener; and means located relative to desired fastener-supplying points on the work to control the operation of the fastener-supplying means.

65. A machine for use in making wire bound boxes comprising, in combination, mechanism for applying binding wire to a succession of box sections progressively subjected to the action thereof; means to present said sections to said mechanism; and means to sever the binding wire between successive sections and provide the severed ends of the wire with interengageable fasteners.

66. A machine for use in making wire bound boxes comprising, in combination, mechanism for applying binding wire to a succession of box blanks; means to present said box blanks to said mechanism; and means to sever the binding wire between successive box blanks and provide the severed ends of the wire with interengageable fasteners whereby the same operation between succeeding box blanks will provide each blank with fastening means adapted to cooperate when the blank is folded into box form.

67. A machine for use in making wire-reenforced boxes comprising, in combination, means to apply binding wire to a box part and means to supply said wire with fastening means.

68. A machine for use in making wire-reenforced boxes comprising, in combination, means to apply a plurality of binding wires to a box part and means to supply said wires with fastening means.

69. A machine for use in making wire-reenforced boxes comprising, in combination, means to connect a plurality of box parts with binding wire and means to sever the binding wire between box parts and supply said wire with fastening means.

70. A machine for use in making wire-reenforced boxes comprising, in combination, means to connect a plurality of box parts with a plurality of binding wires and means to sever the binding wires between box parts and supply the severed ends with fastening means.

In testimony whereof, I have signed my name to this specification.

HENRY J. KOCH.